(12) United States Patent
Plancarte et al.

(10) Patent No.: US 8,990,820 B2
(45) Date of Patent: Mar. 24, 2015

(54) RUNTIME TASK WITH INHERITED DEPENDENCIES FOR BATCH PROCESSING

(75) Inventors: Gustavo A. Plancarte, Bothell, WA (US); Tao Wang, Issaquah, WA (US); Vijay B. Kurup, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1569 days.

(21) Appl. No.: 12/339,083

(22) Filed: Dec. 19, 2008

(65) Prior Publication Data
US 2010/0162245 A1 Jun. 24, 2010

(51) Int. Cl.
G06F 9/46 (2006.01)
G06F 9/48 (2006.01)

(52) U.S. Cl.
CPC ...... *G06F 9/4843* (2013.01); *G06F 2209/5017* (2013.01)
USPC .......................................... 718/101

(58) Field of Classification Search
None
See application file for complete search history.

(56) References Cited

U.S. PATENT DOCUMENTS

| | | | |
|---|---|---|---|
| 5,764,981 A * | 6/1998 | Brice et al. ................... | 718/101 |
| 6,112,225 A * | 8/2000 | Kraft et al. ................... | 709/202 |
| 6,289,382 B1 * | 9/2001 | Bowman-Amuah ......... | 709/226 |
| 6,393,433 B1 | 5/2002 | Kalavade et al. | |
| 7,165,252 B1 | 1/2007 | Xu | |
| 2002/0078117 A1 * | 6/2002 | Wang Baldonado et al. . | 709/101 |
| 2002/0078130 A1 * | 6/2002 | Thornton et al. ............. | 709/201 |
| 2003/0135384 A1 | 7/2003 | Nguyen | |
| 2004/0025163 A1 * | 2/2004 | Babutzka et al. ............. | 718/106 |
| 2005/0071137 A1 | 3/2005 | Selvaraj et al. | |
| 2005/0198636 A1 * | 9/2005 | Barsness et al. ............. | 718/100 |
| 2006/0048155 A1 * | 3/2006 | Wu et al. ....................... | 718/101 |
| 2007/0005413 A1 | 1/2007 | Hennings et al. | |
| 2007/0033592 A1 | 2/2007 | Roediger et al. | |
| 2007/0101331 A1 | 5/2007 | Krebs | |
| 2008/0163238 A1 | 7/2008 | Jiang | |
| 2009/0265710 A1 * | 10/2009 | Shen et al. .................... | 718/101 |

OTHER PUBLICATIONS

Microsoft (Microsoft Dynamics AX 2009—Journal Batch Posting); White Paper; Sep. 29, 2008; 20 pages.*
Microsoft (Inside Microsoft Dynamics AX 2009); 2009; ISBN 13: 9780735626454; pp. 559-579.*

(Continued)

*Primary Examiner* — Keith Vicary
(74) *Attorney, Agent, or Firm* — Damon Rieth; Aaron Hoff; Micky Minhas

(57) ABSTRACT

A batch job processing architecture that dynamically creates runtime tasks for batch job execution and to optimize parallelism. The task creation can be based on the amount of processing power available locally or across batch servers. The work can be allocated across multiple threads in multiple batch server instances as there are available. A master task splits the items to be processed into smaller parts and creates a runtime task for each. The batch server picks up and executes as many runtime tasks as the server is configured to handle. The runtime tasks can be run in parallel to maximize hardware utilization. Scalability is provided by splitting runtime task execution across available batch server instances, and also across machines. During runtime task creation, all dependency and batch group information is propagated from the master task to all runtime tasks. Dependencies and batch group configuration are honored by the batch engine.

20 Claims, 8 Drawing Sheets

(56) References Cited

OTHER PUBLICATIONS

"7X24 Solutions for the Oracle Enterprise", Retrieved at <<http://www.softstart.com/WhitePaper.pdf>>, Dec. 23, 1998, White Paper, pp. 1-13.

"Business Objects Data Integration", Retrieved at <<http://www.businessobjects.com/pdf/products/dataintegration/br_data_integration.pdf>>.

Blikberg, et al., "Load Balancing and OpenMP Implementation of Nested Parallelism", Retrieved at <<http://www.uib.no/People/nmits/papers/loadbalance.pdf>>, Parallel Computing 31 (2005), pp. 984-998.

Raghavan, et al., "DPAC: An Object-Oriented Distributed and Parallel Computing Framework for Manufacturing Applications", Retrieved at <<http://eprints.iisc.ernet.in/5016/1/DPAC.pdf>>, IEEE Transactions on Robotics and Automation, vol. 18, No. 4, August 2002, pp. 431-443.

\* cited by examiner

RUNTIME TASK WITH INHERITED DEPENDENCIES FOR BATCH PROCESSING

BACKGROUND

A batch framework can typically support a single task that represents a job. The framework can also execute serial tasks with the assistance of a batch journal; however, there may not be other dependency support. Additionally, tasks execution can require connecting a client and manually launching a batch engine. Other batch engines can employ a workflow style where a task that finishes executing includes the logic about what to do next.

For example, the following limitations can exist in current batch processing frameworks. The framework requires a client for processing batch jobs, and the batch cannot simply be submitted with the assumption that the job will be executed, as the job may not run if a client is not open. Moreover, the framework may not support parallelism. There can be various scenarios where a batch job that processes transactions, for example, could be broken into separate sub-jobs and executed against different batch server instances to increase throughput and reduce overall execution time. Moreover, the batch framework may not allow the creation of a dependency tree for the different tasks that comprise the batch job.

Given the advances in hardware and software, consumers seek more efficient mechanisms for handling task processing for all purposes, such as in business environments.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes the concept of runtime tasks, which are dynamic tasks that are created for one batch job execution to maximize parallelism. The implementation of runtime tasks allows the job to dynamically create a number of tasks to efficiently complete the job. The task creation can be based on the amount of processing power available locally or across batch servers. The work can be allocated across multiple threads in multiple batch server instances as there are available.

A master task splits the items to be processed into smaller parts and creates a runtime task for each. The batch server can pick up and execute as many runtime tasks as the server is configured to handle (e.g., a maximum number of tasks such as four). The runtime tasks can be run in parallel to maximize hardware utilization. Scalability is provided by splitting the runtime task execution across available multiple batch server instances, and also across machines.

Dependencies and batch group configuration will still be honored by the batch engine. During runtime task creation, all dependency and batch group information is propagated from the master task to all runtime tasks.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
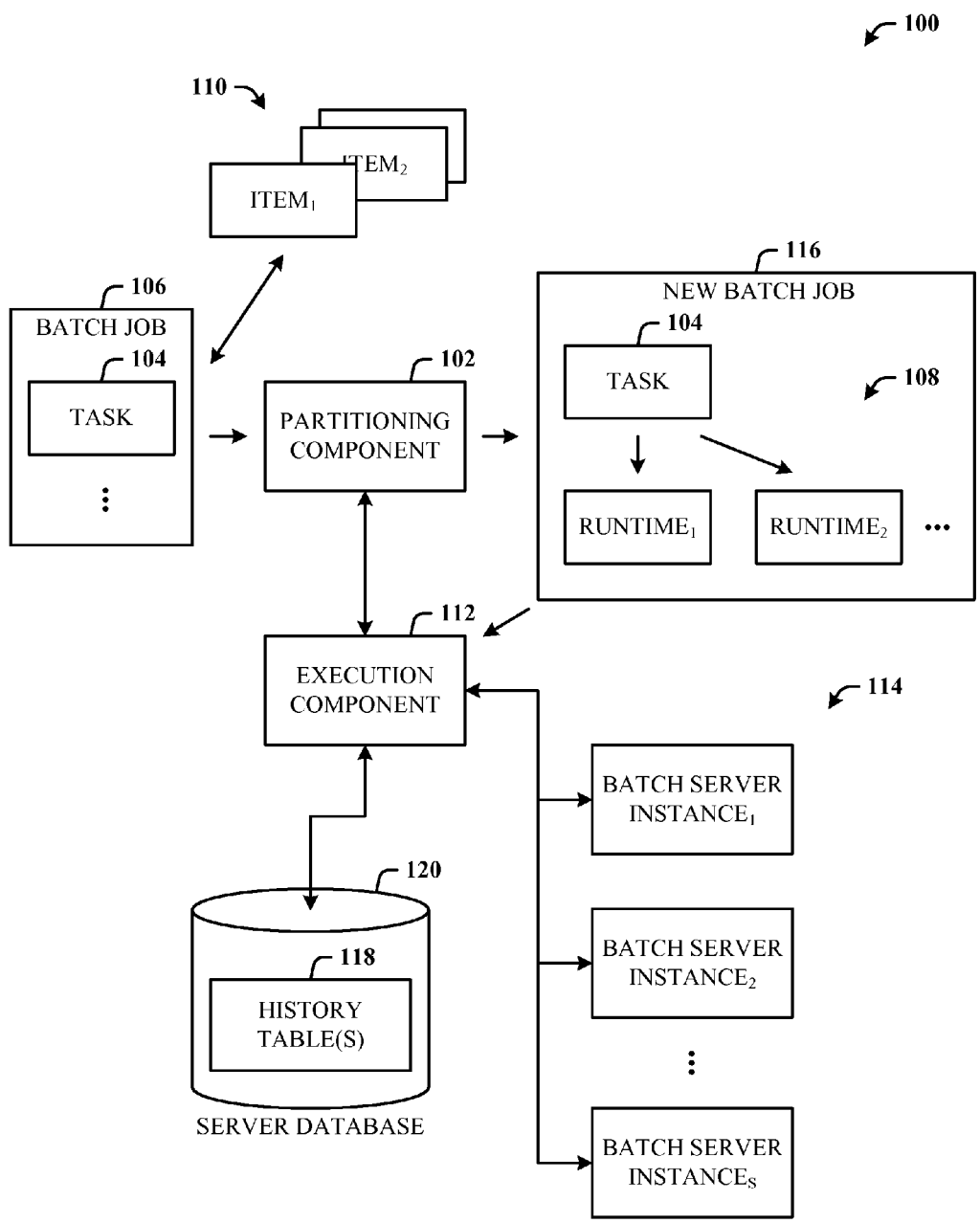
FIG. 1 illustrates a computer-implemented batch processing system in accordance with the disclosed architecture.

A batch processing system can allow the creation of dependencies within batch tasks. When a batch server detects that a task has met its dependency constraints, the server picks the task for execution. A task runs in its own session. Thus, when a task needs to process several items, such as in an inventory closing for a business, this can negatively affect overall performance and time to finish the task.

To solve this problem, the disclosed architecture introduces a runtime task. A master task, similar to the batch task described above, splits the items to be processed into smaller parts and creates a runtime task for each item or item part. The batch server can pick up and execute as many tasks as configured (via configuration data). The tasks will be run in parallel, thereby maximizing hardware utilization. If multiple server instances are available across different servers, then the work can be split across the machines, improving scalability even further.

At the end of the batch run, the status and log information of the runtime tasks can be saved in history tables, and then the runtime tasks are deleted from the job. Next time when the job runs, either because the job is a recurrent job or because a user manually rescheduled the job, the master task can recreate the runtime tasks according to the amount of work needed at the moment.

Two considerations with runtime tasks involve dependencies and batch group information. There can be other tasks that depend on the main task being run. In this case, other dependent tasks should not be run until all runtime tasks finish. Furthermore, the master task's batch group configuration is inherited. A batch group is a way to configure certain server instances to run only certain types of batch tasks. During the runtime task creation, all dependency and batch group information is propagated from the master task to all runtime tasks.

In other words, the runtime tasks are dynamic tasks created for one batch job run to maximize parallelism. This allows a job to dynamically create the number of tasks it needs depending on the amount of processing to do. The work is split across several threads in as many batch server instances as there are available. Dependencies and batch group configuration are still honored by the batch engine.

As utilized herein, a batch job is a logical group of tasks that includes settings such as recurrence and can be saved into a batch job table. A batch job is saved into a batch table. A batch task is a unit of execution that includes all the information needed to run an instance of a batch class. The batch task can also have dependencies with other batch tasks within the same batch job. The same task can be in the same batch job more than once and have different dependencies. The batch task is saved into the batch table. A batch server is a server that can obtain and execute batch tasks and process dependencies. A batch group is an attribute of a batch job that allows an administrator to determine which batch server runs the job and how many jobs a batch server can run.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented batch processing system 100 in accordance with the disclosed architecture. The system 100 includes a partitioning component 102 for splitting a task 104 of a batch job 106 into runtime tasks 108 based on associated items 110 to be processed. The system 100 can also include an execution component 112 for processing the runtime tasks 108 concurrently using threads of available batch server instances 114. The creation of the runtime tasks 108 along with the task 104 (also referred to as the master task) is represented as a new batch job 116.

The execution component 112 persists runtime task status information and log information in one or more history tables 118 of a server database 120 associated with a batch server. The partitioning component 102 can recreate the runtime tasks 108 in response to the task 104 being processed again (due to scheduling, recurrency, etc.). The runtime tasks 108 can be recreated based on the amount of work to be performed at a specific time (e.g., immediately). The execution component 112 deletes the runtime tasks 108 and associated dependencies upon completion of the task 104. The partitioning component 102 and execution component 112 can be utilized as part of an enterprise resource planning (ERP) framework.

Although illustrated as external to the server database 120, the batch job is tracked and prepared for processing on the database 120. Dependencies are applied to the runtime tasks 108 based on the task 104. More specifically, the dependencies can be applied directly to the database 120, which includes tasks waiting to be picked up and executed based on a status in a batch table. The database 120 can include a batch table that stores batch job task status information such as for a parent (or root) task status information such as "Ready" (pick up for execution), "Waiting" (in execution, but not yet processed), "Executing" (currently being executed), and so on. A batch dependencies table can also be stored in the database 120 to define and track dependencies between batch tasks.

The disclosed architecture includes a distributed highly available and scalable task execution framework. Each batch server (202 and 212) knows when and how to pick the next available task from the database 120. Each server periodically checks if there are new jobs that are scheduled to execute immediately and picks a task for execution. Multiple batch server configurations can be created as configuration data and executed so that each server can behave differently to provide improved response time to online users, including rich clients and web clients.

Figure 2:
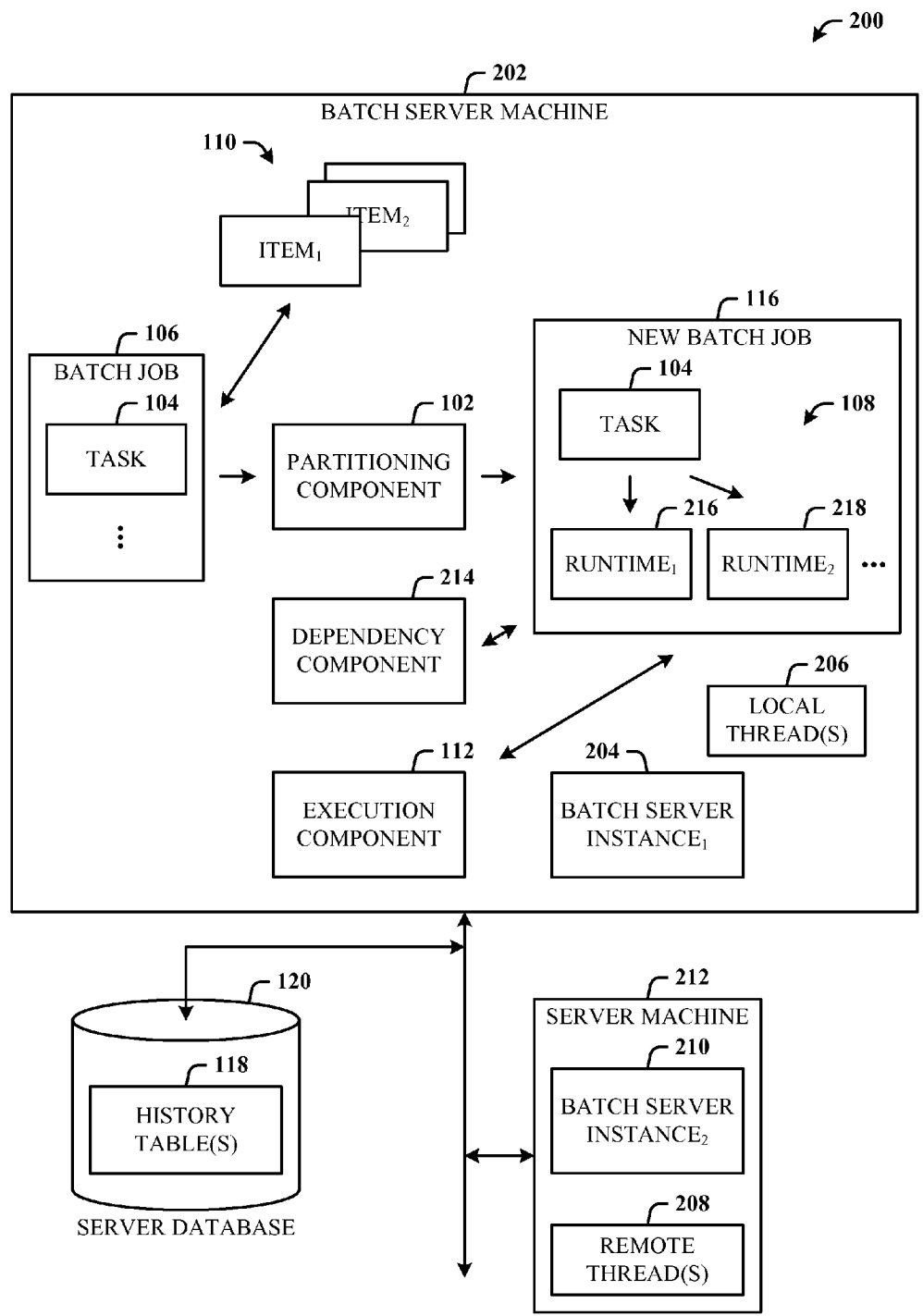
FIG. 2 illustrates an alternative embodiment of a batch processing system.

FIG. 2 illustrates an alternative embodiment of a batch processing system 200. The system 200 includes a batch server machine 202 for running a batch server instance 204 for batch processing of the batch job 106. The system 200 includes the partitioning component 102 for splitting the task 104 of the batch job 106 into the runtime tasks 108 based on the associated items 110 to be processed. The system 200 also includes the execution component 112 for processing the runtime tasks 108 concurrently using one or more local threads 206. Concurrent processing can also be obtained using one or more remote threads 208 of an available batch server instance 210 of a server machine 212. The creation of the runtime tasks 108 along with the task 104 is represented as the new batch job 116.

The system 200 can further comprise a dependency component 214 for propagating dependency information and batch group information of the task 104 (the master task) to the runtime tasks 108.

As indicated, the threads (local thread(s) 206 and remote thread(s) 208) can be associated with different server machines (machine 202 and machine 212) and the runtime tasks 108 can be processed in parallel on the different server machines (202 and 212).

The local thread(s) 206 can be applied on a per server instance basis. In other words, if the server machine 202 includes a quad-core processor (four cores), the local thread(s) 206 can be assigned one thread to a server instance (the server instance assigned to one core), two threads to one server instance (and the instance assigned to one core), and so on. Put another way, a first runtime task 216 can be assigned (or picked up) to one of the local thread(s) 206 and a second runtime task 218 can be assigned (or picked up) for processing by one of the remote thread(s) 208.

The execution component 112 stores runtime task status information and log information in the one or more history tables 118 of the server database 120 associated with the batch server 202. The partitioning component 102 can recreate the runtime tasks 108 in response to the task 104 being processed again. The runtime tasks 108 can be recreated based on the amount of work to be performed at a specific time (e.g., immediately). The partitioning component 102, execution component 112, and dependency component 214 can be utilized as part of an ERP framework.

Figure 3:
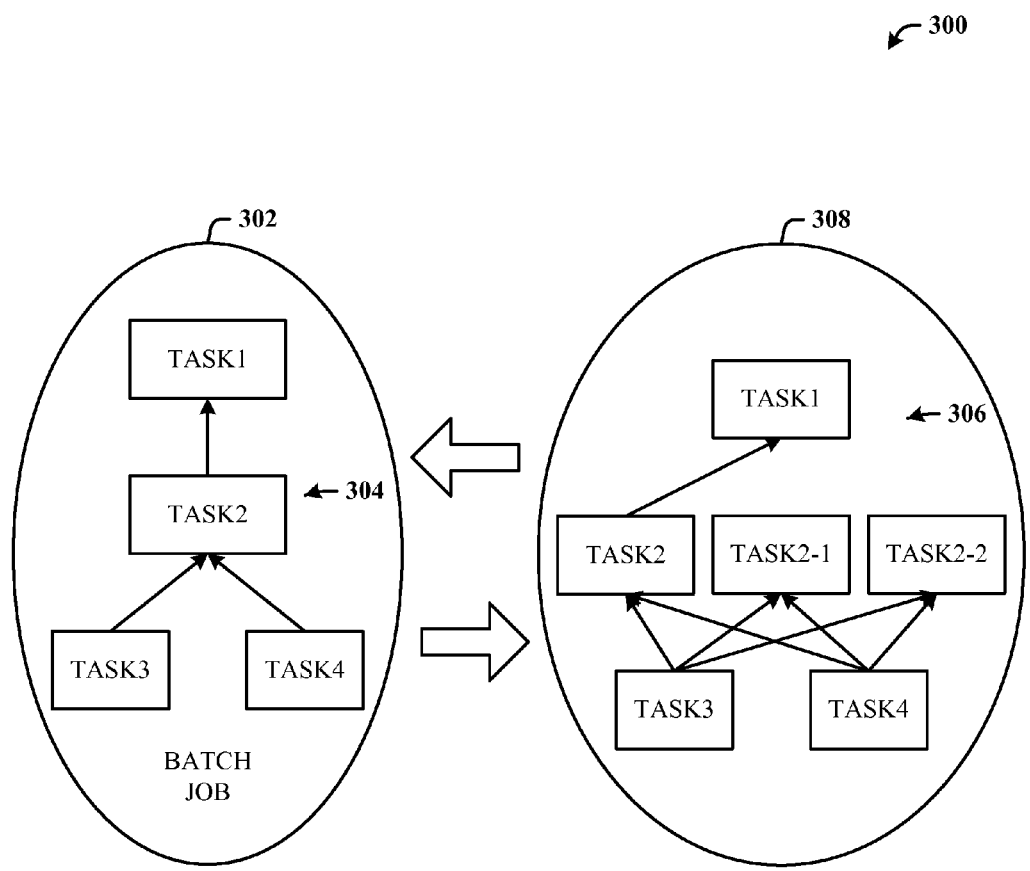
FIG. 3 illustrates a flow diagram of a batch job and runtime task creation for optimized concurrent processing.

FIG. 3 illustrates a flow diagram 300 of a batch job and runtime task creation for optimized concurrent processing. An original batch job 302 includes four tasks and the following dependencies (as depicted by a dependency tree 304): Task 2 depends on Task 1 and, Task 3 and Task 4 depend on Task 2. When Task 2 executes, the runtime tasks Task2-1 and Task2-2 are created, and a batch engine will automatically make Task 3 and Task 4 depend on the runtime tasks Task 2-1 and Task 2-2, as well, as shown in a modified dependency tree 306 of a modified batch job 308. When the modified batch job 308 finishes, the four original tasks (Task1, Task2, Task3, and Task4) and the two runtime tasks Task2-1 and Task2-2 are copied to one or more batch history tables. The runtime tasks Task2-1 and Task2-2 are then deleted to restore the modified batch job 308 to its state in the original batch job 302. Note that the new dependencies created between Task 3 and Task 4, and the runtime tasks Task2-1 and Task2-2 are also deleted.

Following is a more detailed description of runtime task creation. When a batch task needs to run, a batch engine (the execution component 112) instantiates a class that inherits from a runbase batch class. Tasks inherit from this abstract class. An instance of a runbase batch class can be considered batch task. A runtime task is different from a normal task in that the batch engine deletes the runtime at the end of the batch job run. To start running a batch task, the batch engine calls a run( ) method on the object representing such task. Within this method call, the steps to create a runtime task can be as follows. Initially, a batch header object can be instantiated that represents a batch job. The batch header object represents a batch job, and contains the collection of tasks and dependencies. Next, as many objects of a class that inherits from the runbase batch class are instantiated as needed depending on the amount of work to be performed at the moment. Next, each task is added to the batch header object by calling a runtime task method. Optionally, an identifier (ID) of the current task can be sent to copy dependency and batch group information. Finally, the batch header object can be saved to transactionally create the runtime tasks with the associated dependencies.

With respect to a database schema for representing a runtime task, the batch table represents batch tasks, and the following field can be used to mark a task as runtime, and the task is what the batch engine uses to determine what tasks to delete, when the batch job finishes executing.

RunTimeTask: type Boolean.

To create a runtime task, the following API (e.g., in x++) can be used inside the run( ) method of the originally scheduled task, which is invoked by the batch engine.

BatchHeader header;
RunBaseBatch runtimeTask;
//Instantiate runtimeTask
header=BatchHeader::construct(this.parmCurrentBatch( ).BatchJobId);
header.addRuntimeTask(runtimeTask, this.parmCurrentBatch( ).RecId);
header.save( );

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
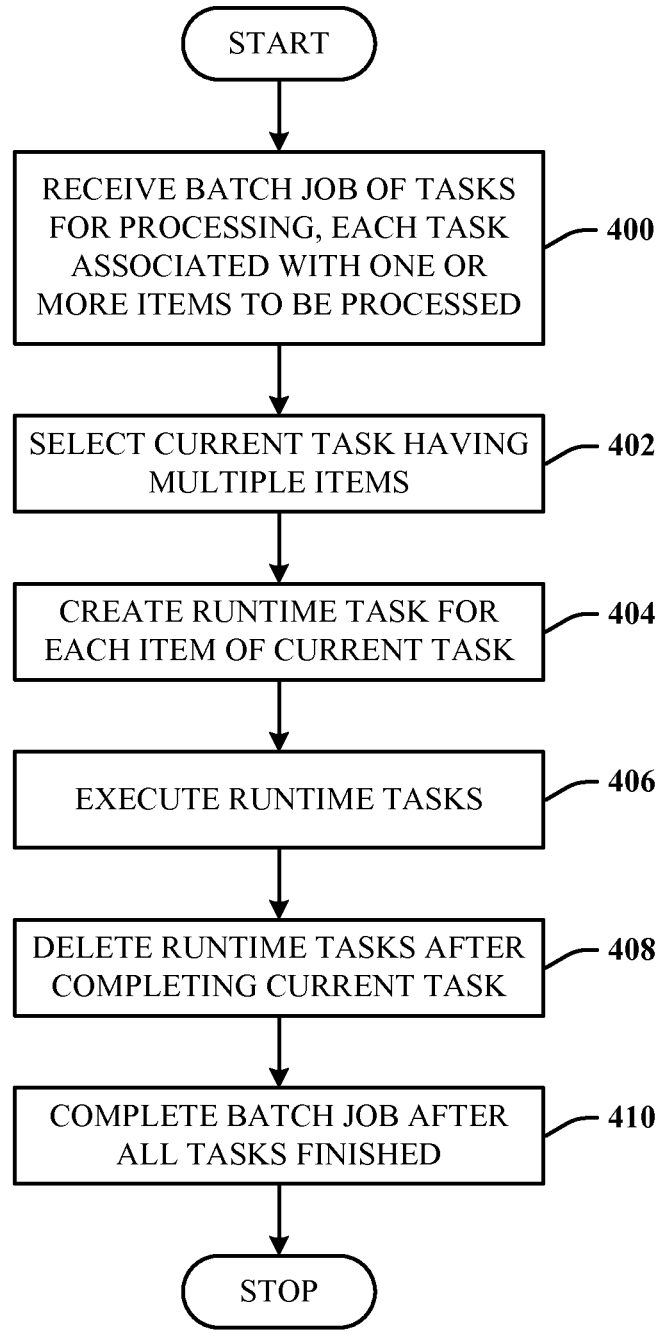
FIG. 4 illustrates a method of processing tasks.

FIG. 4 illustrates a method of processing tasks. At 400, a batch job of tasks is received, where each task is associated with one or more items to be processed. At 402, a current task having multiple items is selected. At 404, a runtime task is created for each item of the current task. At 406, the runtime tasks are executed. At 408, the runtime tasks are deleted after completing the current task. At 410, the batch job is completed when all tasks are finished.

Figure 5:
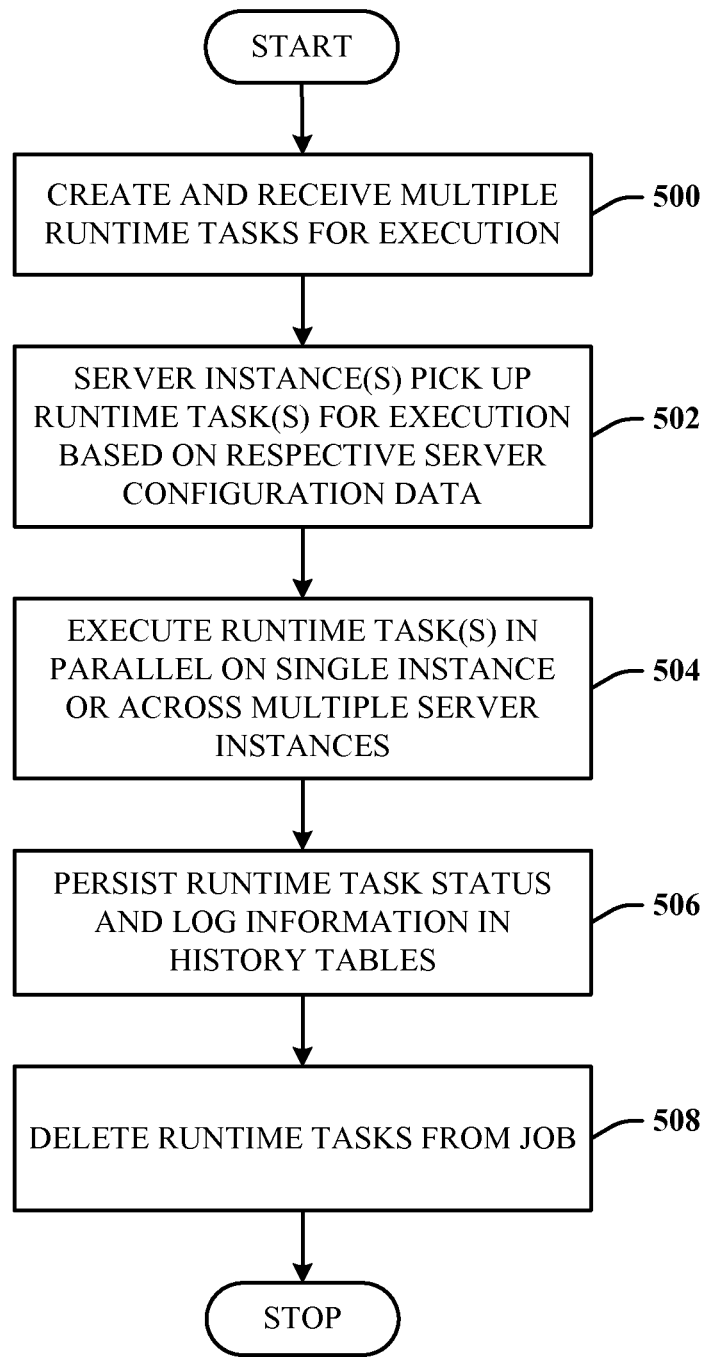
FIG. 5 illustrates a method of allocating runtime tasks across available batch server instances.

FIG. 5 illustrates a method of allocating runtime tasks across available batch server instances. At 500, multiple runtime tasks for execution are created and received. At 502, one or more server instance(s) pick up the runtime tasks for execution based on respective server configuration data. The configuration data describes task execution behavior of the batch server such as how many tasks the associated batch server is allowed to handle (e.g., as defined by an administrator). At 504, the runtime tasks are executed in parallel on a single server instance or across multiple server instances. At 506, the runtime task status and log information is persisted in one or more history tables. At 508, the runtime tasks are deleted from the batch job.

The method can further comprise defining new dependencies for the runtime tasks based on dependencies of the current task, and deleting the new dependencies after completing the current task. The method can further comprise persisting status information and log information associated with the runtime tasks in one or more history tables. The runtime tasks can be assigned to different processor cores for concurrent task execution.

The method can further comprise recreating the runtime tasks based on the batch job being run again. A defined number of the runtime tasks can be created based on an amount of work that is to be performed for the current task. The method can further comprise executing the runtime tasks based on server behavior defined by server configuration data.

Figure 6:
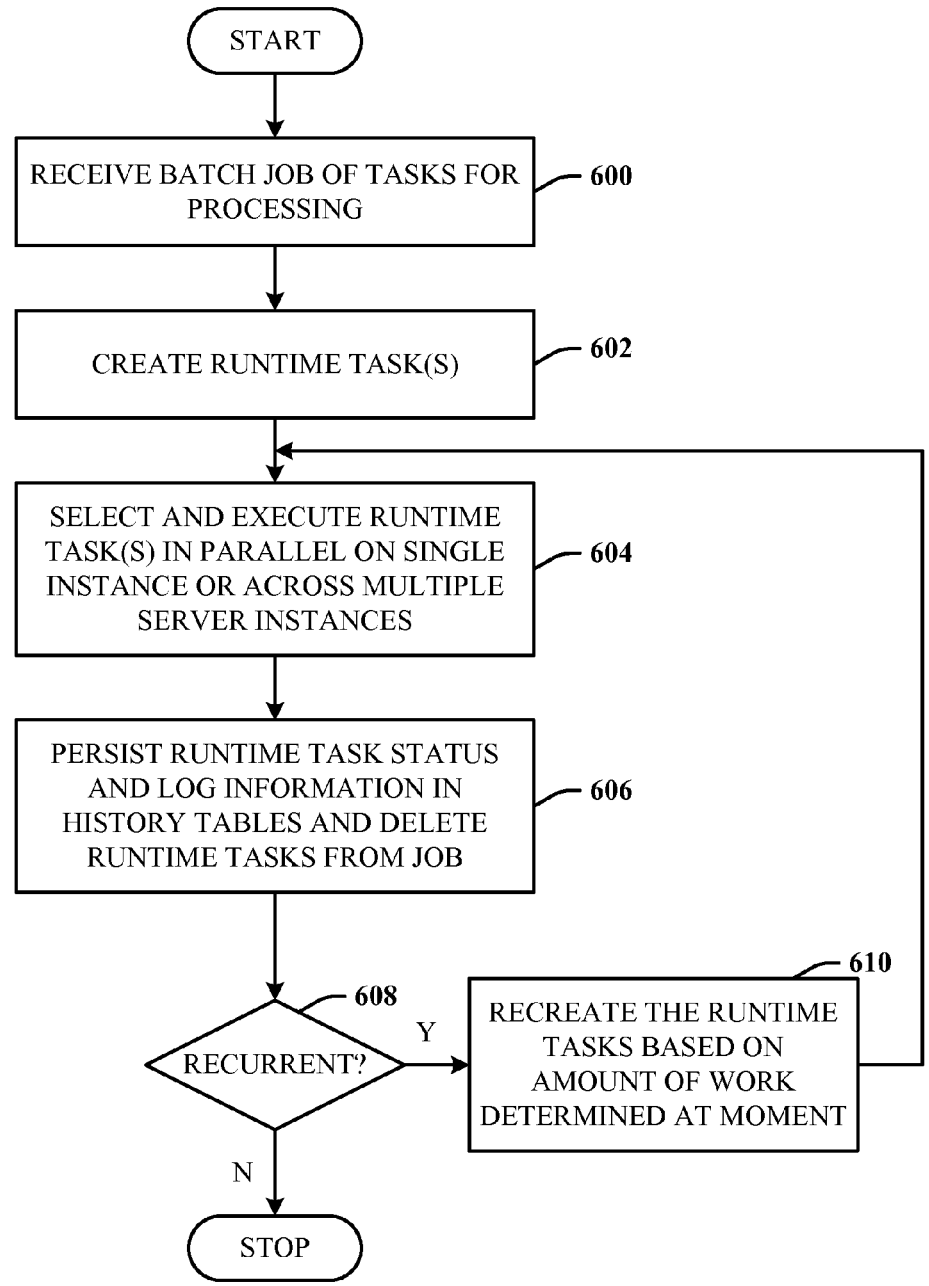
FIG. 6 illustrates a method of handling recurrent jobs using runtime tasks.

FIG. 6 illustrates a method of handling recurrent jobs using runtime tasks. At 600, a batch job of tasks is received for processing. At 602, runtime tasks are created by a master task. At 604, the runtime tasks are selected and executed in parallel on a single instance or across multiple server instances. At 606, the runtime task status and log information is persisted in one or more history tables. At 608, a check is made to determine if this is a recurrent job. If so, flow is to 610 where the runtime tasks are recreated based on the amount of work determined at the moment. Flow can then be back to 604 to select and execute the runtime tasks again.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
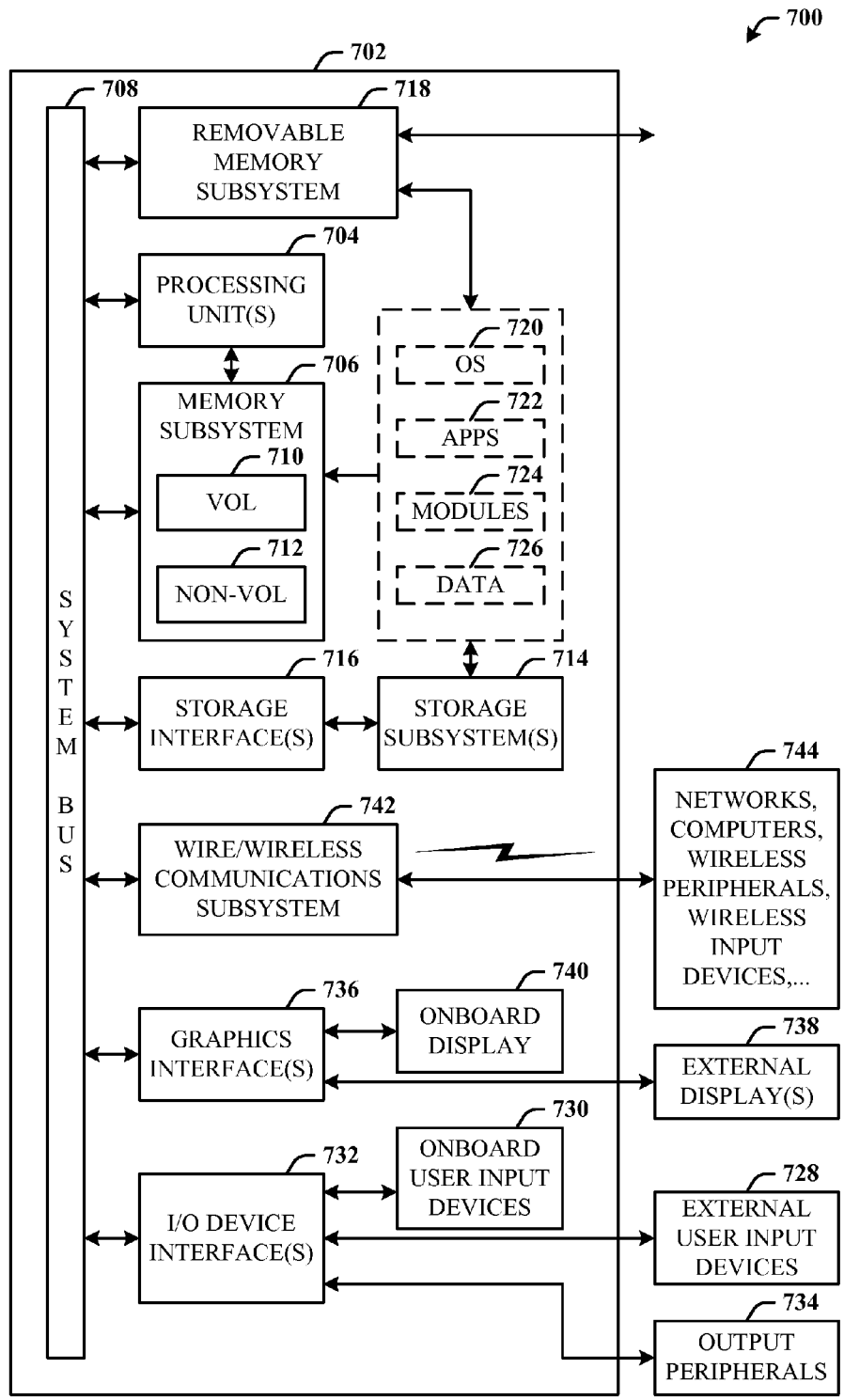
FIG. 7 illustrates a block diagram of a computing system operable to create and execute runtime tasks and runtime dependencies in accordance with the disclosed architecture.

Referring now to FIG. 7, there is illustrated a block diagram of a computing system 700 operable to create and execute runtime tasks and runtime dependencies in accordance with the disclosed architecture. In order to provide additional context for various aspects thereof, FIG. 7 and the following discussion are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the memory subsystem 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes storage subsystem(s) 714 and storage interface(s) 716 for interfacing the storage subsystem(s) 714 to the system bus 708 and other desired computer components. The storage subsystem(s) 714 can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a removable memory subsystem 718 (e.g., flash drive form factor technology), and/or the storage subsystem(s) 714, including an operating system 720, one or more application programs 722, other program modules 724, and program data 726. Where the computer 702 is a server machine, and the computer 702 interfaces to the database 120, the one or more application programs 722, other program modules 724, and program data 726 can include the system 100 of FIG. 1, as well as some or all of the instances 114, the batch server machine 202 of FIG. 2, the diagram 300 of FIG. 3, and the methods of FIGS. 4-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Computer readable media can be any available media that can be accessed by the computer 702 and includes volatile and non-volatile media, removable and non-removable media. For the computer 702, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such as a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP) using logical connections via a wire/wireless communications subsystem 742 to one or more networks and/or other computers. The other computers can include workstations, servers, routers, personal computers, microprocessor-based entertainment appliances, a peer device or other common network node, and typically include many or all of the elements described relative to the computer 702. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wire/wireless communication subsystem 742 (e.g., a network interface adapter, onboard transceiver subsystem, etc.) to communicate with wire/wireless networks, wire/wireless printers, wire/wireless input devices 744, and so on. The computer 702 can include a modem or has other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
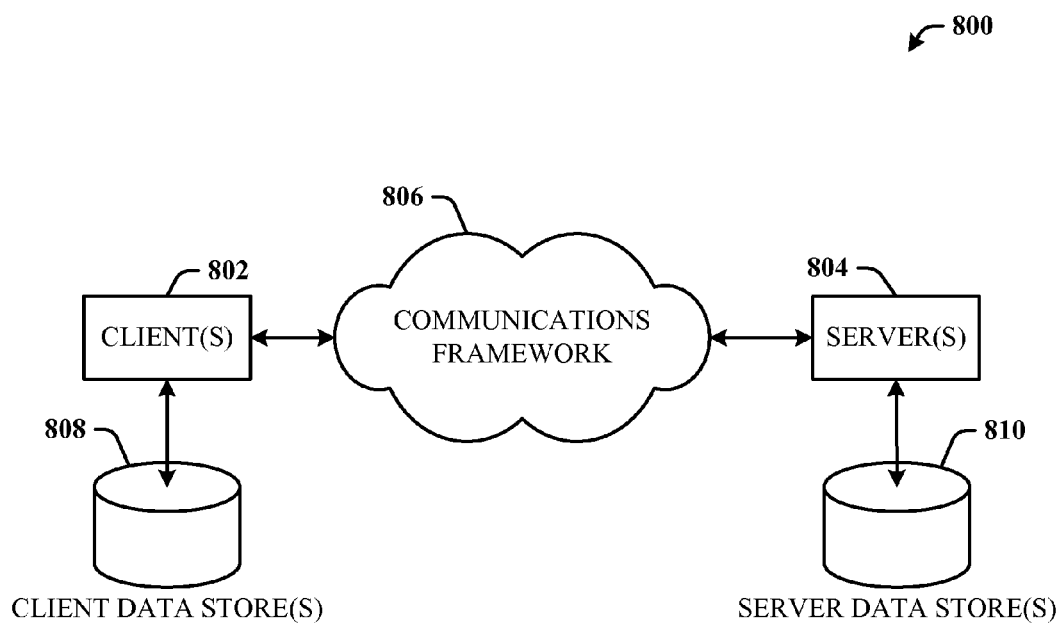
FIG. 8 illustrates a schematic block diagram of a computing environment that facilitates runtime tasks and runtime dependencies creation and processing.

Referring now to FIG. 8, there is illustrated a schematic block diagram of a computing environment 800 that facilitates runtime tasks and runtime dependencies creation and processing. The environment 800 includes one or more client(s) 802. The client(s) 802 can be hardware and/or software (e.g., threads, processes, computing devices). The client(s) 802 can house cookie(s) and/or associated contextual information, for example.

The environment 800 also includes one or more server(s) 804. The server(s) 804 can also be hardware and/or software (e.g., threads, processes, computing devices). The servers 804 can house threads to perform transformations by employing the architecture, for example. One possible communication between a client 802 and a server 804 can be in the form of a data packet adapted to be transmitted between two or more computer processes. The data packet may include a cookie and/or associated contextual information, for example. The environment 800 includes a communication framework 806 (e.g., a global communication network such as the Internet) that can be employed to facilitate communications between the client(s) 802 and the server(s) 804.

Communications can be facilitated via a wire (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804. The server(s) 804 can include the server machines (202 and 212), and the server datastore(s) 810 can include the database 120, for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented batch processing system, comprising:
   a partitioning component configured to split a task of a batch job into dependent runtime tasks based on associated items to be processed such that dependency and batch group information is propagated from the task to the dependent runtime tasks;
   a batch server component configured to pick the dependent runtime tasks for execution upon detecting that the dependent runtime tasks have met dependency constraints;
   an execution component configured to process the dependent runtime tasks concurrently using threads of available batch server instances, by instantiating a batch header object that represents a batch job and contains the dependent runtime tasks and dependencies, and by instantiating a plurality of objects of a class that inherits from a batch class, depending on an amount of work to be performed, and by adding each dependent runtime task to the batch header object by calling a runtime task method; and
   a processor that executes computer-executable instructions stored in a memory associated with the partitioning component, the batch server component, and the execution component.

2. The system of claim 1, further comprising a dependency component configured to propagate the dependency information and the batch group information of the task to the dependent runtime tasks.

3. The system of claim 2, wherein the partitioning component, the execution component, and the dependency component are utilized as part of an enterprise resource planning (ERP) framework.

4. The system of claim 1, wherein the execution component persists runtime task status information and log information in one or more history tables.

5. The system of claim 1, wherein the partitioning component recreates the dependent runtime tasks in response to the task being processed again, the dependent runtime tasks recreated based on an amount of work to be performed at a specific time.

6. The system of claim 1, wherein the threads are associated with different server machines and the dependent runtime tasks are distributed for concurrent processing on the different server machines.

7. The system of claim 1, wherein the threads are applied on a per instance basis.

8. The system of claim 1, wherein the execution component deletes the dependent runtime tasks and associated dependencies upon completion of the task.

9. A computer-implemented batch processing system, comprising:
   a partitioning component configured to split a task of a batch job into dependent runtime tasks based on associated items to be processed at a specific time;
   a batch server component configured to pick the dependent runtime tasks for execution upon detecting that the dependent runtime tasks have met dependency constraints;
   an execution component configured to process the dependent runtime tasks concurrently using threads of available batch server instances, by instantiating a batch header object that represents a batch job and contains the dependent runtime tasks and dependencies, and by instantiating a plurality of objects of a class that inherits from a batch class, depending on an amount of work to be performed, and by adding each dependent runtime task to the batch header object by calling a runtime task method;
   a dependency component configured to propagate dependency information and batch group information from the task of the batch job to the dependent runtime tasks; and
   a processor configured to execute computer-executable instructions stored in a memory associated with the partitioning component, the batch server component, the execution component, and the dependency component.

10. The system of claim 9, wherein the partitioning component, the execution component, and the dependency component are utilized as part of an enterprise resource planning (ERP) framework.

11. The system of claim 9, wherein the execution component persists runtime task status information and log information in one or more history tables, and deletes the dependent runtime tasks and associated dependencies upon completion of the task.

12. The system of claim 9, wherein the threads are associated with different server machines, the dependent runtime tasks are distributed for concurrent processing on the different server machines and the threads are applied on a per instance basis on the server machines.

13. A computer-implemented method of processing tasks, comprising acts of:
 receiving a batch job of tasks, each task associated with one or more items to be processed;
 selecting a current task having multiple items;
 creating a dependent runtime task for each item of the current task;
 creating dependency constraints for each dependent runtime task;
 picking the dependent runtime tasks for execution upon detecting that the dependent runtime tasks have met respective dependency constraints;
 storing batch job task status information that indicate at least one of pick up for execution, in execution but not yet processed, or currently being executed;
 executing the dependent runtime tasks based on the respective dependency constraints by:
  instantiating a batch header object that represents a batch job and contains the dependent runtime tasks and dependencies;
  instantiating a plurality of objects of a class that inherits from a batch class, depending on an amount of work to be performed; and
  adding each dependent runtime task to the batch header object by calling a runtime task method;
 deleting the dependent runtime tasks after completing the current task;
 completing the batch job of tasks when all the tasks are finished; and
 utilizing a processor that executes instructions stored in a memory, the instructions associated with the above acts.

14. The method of claim 13, further comprising defining dependencies for the dependent runtime tasks based on dependencies of the current task.

15. The method of claim 14, further comprising deleting the dependencies for the dependent runtime tasks after completing the current task.

16. The method of claim 13, further comprising persisting status information and log information associated with the dependent runtime tasks in one or more history tables.

17. The method of claim 13, further comprising assigning the dependent runtime tasks to different processor cores for concurrent task execution.

18. The method of claim 13, further comprising recreating the dependent runtime tasks based on the batch job being run again.

19. The method of claim 13, further comprising creating a defined number of the dependent runtime tasks based on an amount of work that is to be performed for the current task.

20. The method of claim 13, further comprising executing the dependent runtime tasks based on server behavior defined by server configuration data.

* * * * *